(12) United States Patent
Lu et al.

(10) Patent No.: US 9,478,883 B2
(45) Date of Patent: Oct. 25, 2016

(54) CARD CONNECTOR

(71) Applicant: Tyco Electronics (Shanghai) Co. Ltd., Shanghai (CN)

(72) Inventors: Mao Lu, Shanghai (CN); Guoxiao Shen, Shanghai (CN); Yunhe Wang, Shanghai (CN); Zhiqiang Li, Shanghai (CN); Yongfeng Ma, Shanghai (CN); Jianfeng Wang, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 14/666,925

(22) Filed: Mar. 24, 2015

(65) Prior Publication Data

US 2015/0270630 A1    Sep. 24, 2015

(30) Foreign Application Priority Data

Mar. 24, 2014    (CN) .......................... 2014 1 0110854

(51) Int. Cl.
| | |
|---|---|
| *H01R 12/52* | (2011.01) |
| *H01R 13/22* | (2006.01) |
| *H01R 12/73* | (2011.01) |
| *H01R 12/71* | (2011.01) |
| *G06K 13/08* | (2006.01) |
| *H01R 13/24* | (2006.01) |

(52) U.S. Cl.
CPC ............. *H01R 12/714* (2013.01); *G06K 13/08* (2013.01); *H01R 13/245* (2013.01)

(58) Field of Classification Search
CPC .............. H01R 12/52; H01R 13/2442; H01R 13/2457; H01R 13/24; H01R 12/73
See application file for complete search history.

(56) References Cited

U.S. PATENT DOCUMENTS

| | | | |
|---|---|---|---|
| 6,568,961 B1 * | 5/2003 | Liburdi .................. | H01R 13/33 439/516 |
| 6,843,688 B2 * | 1/2005 | Matsunaga .......... | G06K 7/0021 439/630 |
| 6,997,751 B2 * | 2/2006 | Miyamoto ......... | H01R 13/2464 439/630 |
| 7,481,686 B2 * | 1/2009 | Uchida ................ | G06K 7/0021 439/630 |
| 7,967,640 B2 * | 6/2011 | Hashimoto .......... | H01R 12/714 439/630 |
| 8,267,704 B2 * | 9/2012 | Cheng .................... | H01R 13/60 439/131 |
| 8,591,263 B2 * | 11/2013 | Hayashi ................. | H01R 12/79 439/495 |

* cited by examiner

*Primary Examiner* — Gary Paumen
(74) *Attorney, Agent, or Firm* — Barley Snyder

(57) ABSTRACT

A card connector for receiving an electrical card is disclosed having a base and a plurality of contacts. The plurality of contacts is positioned on the base. Each contact has a support member with two elastic arms extending away from the base. Each elastic arm has an edge that intersects together at a vertex that is elastically flexible toward and away from the base. Each contact further includes a contact element positioned at the vertex.

19 Claims, 7 Drawing Sheets

CARD CONNECTOR

CROSS-REFERENCE TO RELATED APPLICATION

This application claims priority under 35 U.S.C. §119(a)-(d) to Chinese Patent Application No. 201410110854.5, dated Mar. 24, 2014.

FIELD OF THE INVENTION

The invention is generally related to a digital card connector, and, more specifically, to a digital card connector having protected contacts.

BACKGROUND

In FIG. 1, a convention card connector is shown having an arrangement of contacts 1 on a base. Each of the contacts 1 extends in a card insertion direction A. Each of the contacts 1 has a single elastic arm 1b and a contact element 1a on an end of the elastic arm 1b.

In order that the contact 1 can deform in a direction perpendicular to the card insertion direction A, the elastic arm 1b must have a length to provide a sufficiently large elastic force. As a result, a contact spacing distance d1 between two adjacent contact elements 1a in the card insertion direction A can be quite large. For example, as shown in FIG. 1, the contact spacing distance d1 may be equal to 7.62 mm. Consequently, such a large contact spacing distance d1 increases a total length of the entire connector in the card insertion direction A.

Furthermore, since each contact 1 has only a single elastic arm 1b, the contact element 1a of the contact 1 is likely to be scratched by a card 100 or a card tray upon insertion. Further still, the contact 1 is likely to be damaged during plugging the card 100 or a card tray into or out of the connector, especially during plugging an empty card tray out of the connector.

SUMMARY

A card connector for receiving an electrical card is disclosed having a base and a plurality of contacts. The plurality of contacts is positioned on the base. Each contact has a support member with two elastic arms extending away from the base. Each elastic arm has an edge that intersects together at a vertex that is elastically flexible toward and away from the base. Each contact further includes a contact element positioned at the vertex.

BRIEF DESCRIPTION OF THE DRAWINGS

The invention will be described by way of example, with reference to the accompanying Figures, of which.

DETAILED DESCRIPTION OF THE EMBODIMENT(S)

Figure 1:
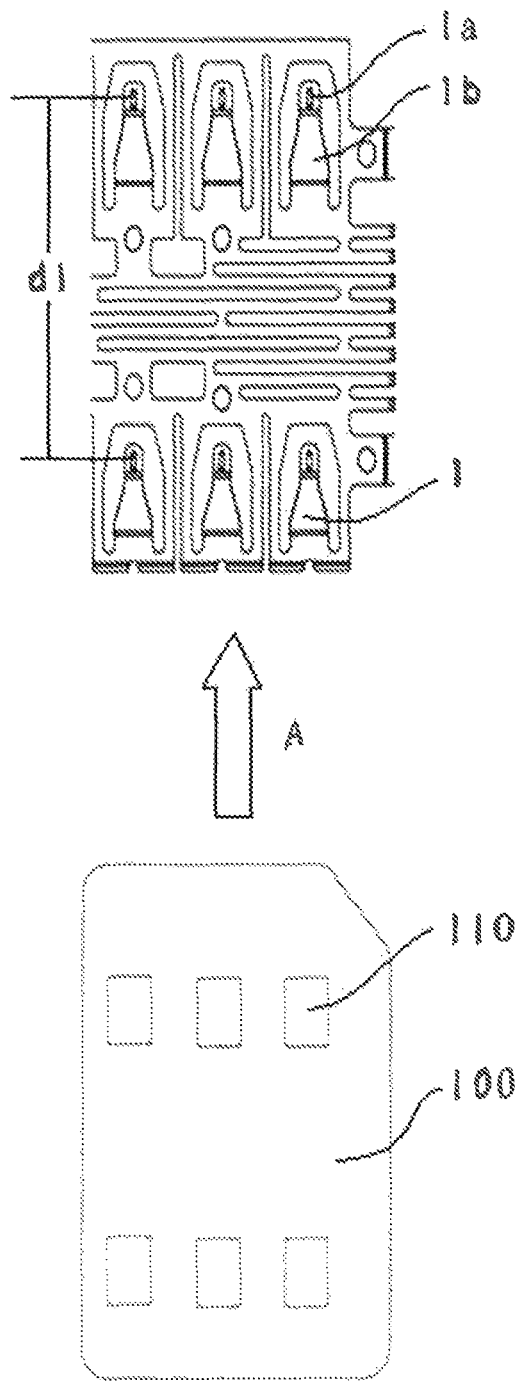
FIG. 1 is a plan view of a plurality of contacts positioned on a base of a conventional card connector, along with a complimentary SIM card.

Exemplary embodiments of the invention will be described hereinafter in detail, with reference to the attached drawings, wherein like reference numerals refer to like elements. The invention may, however, be embodied in many different forms, and the disclosure should not be construed as being limited to the embodiment set forth herein. Rather, these embodiments are provided so that the disclosure will be thorough and complete, and will fully convey the concept of the disclosure to those of ordinary skill in the art.

In the following detailed description, for purposes of explanation, numerous specific details are set forth in order to provide a thorough understanding of the disclosed embodiments.

However, it will be apparent to those of ordinary skill in the art that one or more embodiments may be practiced without these specific details. Further, well-known structures and devices are schematically shown in order to simplify the drawing.

Figure 2:
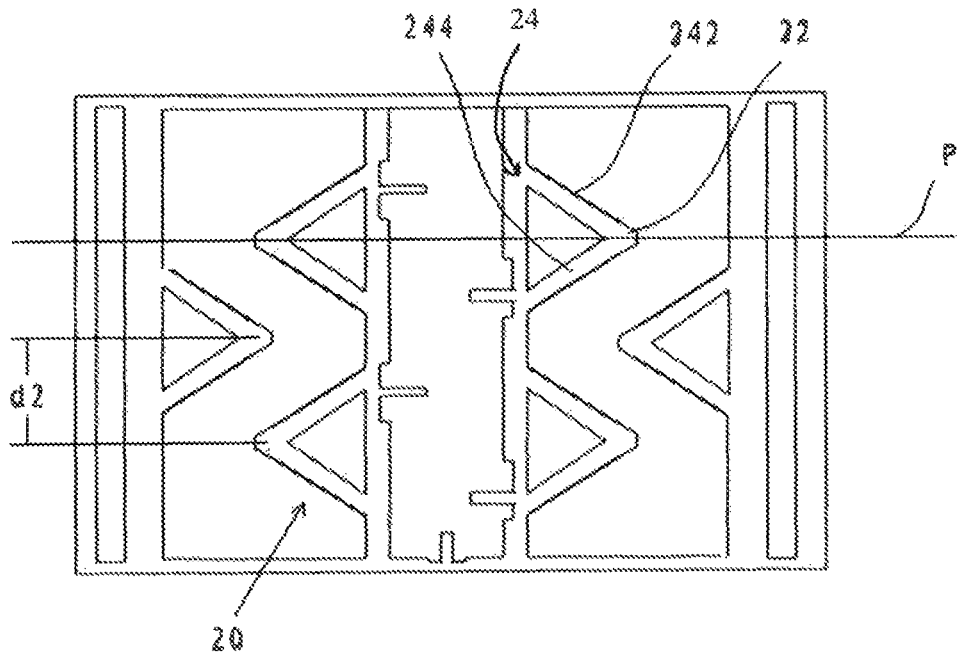
FIG. 2 is a plan view of an arrangement of contacts on a base of a card connector.
Figure 3:
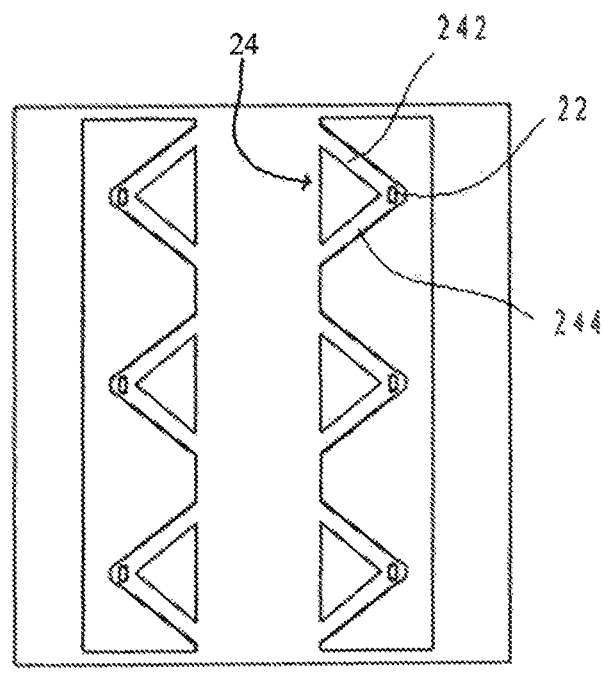
FIG. 3 is a plan view of an arrangement of contacts on a base of a card connector.
Figure 4:
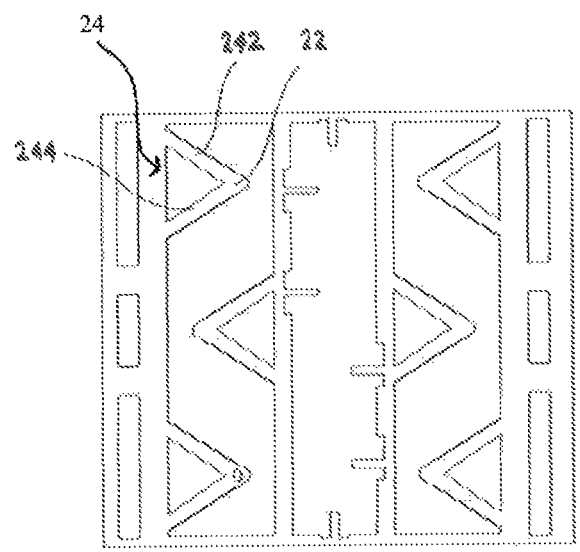
FIG. 4 is a plan view of an arrangement of contacts on a base of a card.
Figure 5:
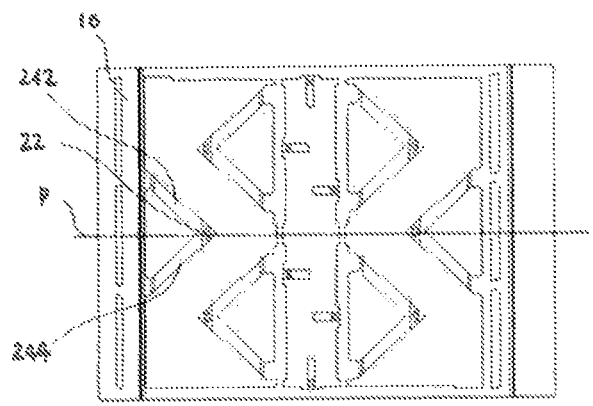
FIG. 5 is a plan view of a card connector, along with a complimentary Subscriber Identity Module ("SIM") card.
Figure 5:
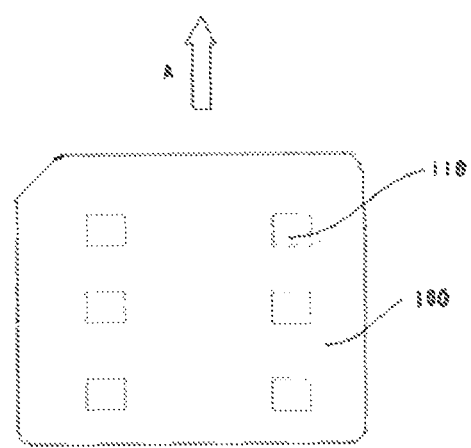
Figure 6:
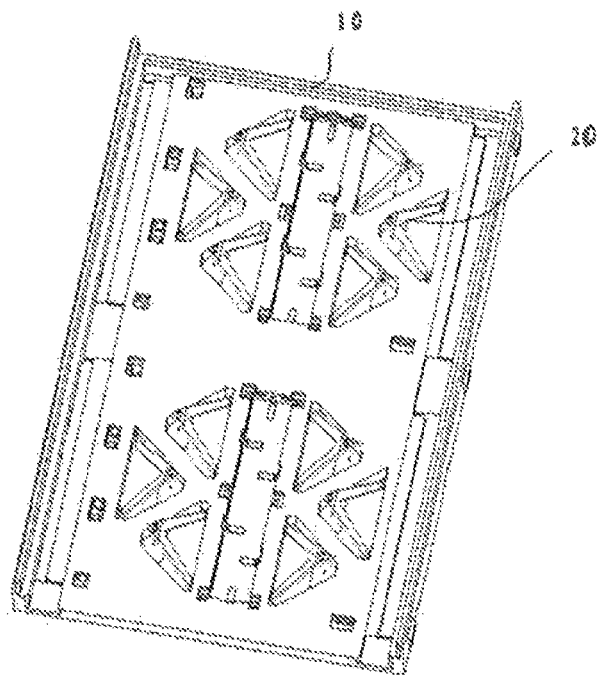
FIG. 6 is a perspective view of a card connector having a housing removed.

As shown in the embodiments of FIGS. 2-6, a card connector is configured to receive an electrical card, such as a SIM card 100. The card connector includes a base 10 having a plurality of contacts 20. The base 10 defines a card receiving space (not labeled) for receiving the electrical card 100 therein. The electrical card 100 is inserted into the card receiving space in a card insertion direction A. Each contact 20 has a contact element 22 that electrically contacts a respective pad 110 positioned on the electrical card 100, and a supporting element forming a vertex on which the contact element 22 is disposed. The supporting element elastically protrudes into the card receiving space (see FIGS. 6 and 9c). The supporting element has two elastic arms 242, 244 extending from the base 10 and intersecting at the contact element 22. The contact element 22 functions as a vertex of two edges formed by the two elastic arms 242, 244. The two elastic arms 242, 244 are positioned on both sides of a plane P passing through the contact element 22 and perpendicular to the card insertion direction A. As shown in the embodiments of FIGS. 2 and 5, the plane P is shown as a line in the top view of the card connector. The two elastic arms 242, 244 are positioned on both sides of the plane P. The elastic arm 242 is a rear elastic arm in the card insertion direction A, and the elastic arm 244 is a front elastic arm in the card insertion direction A.

Figure 7:
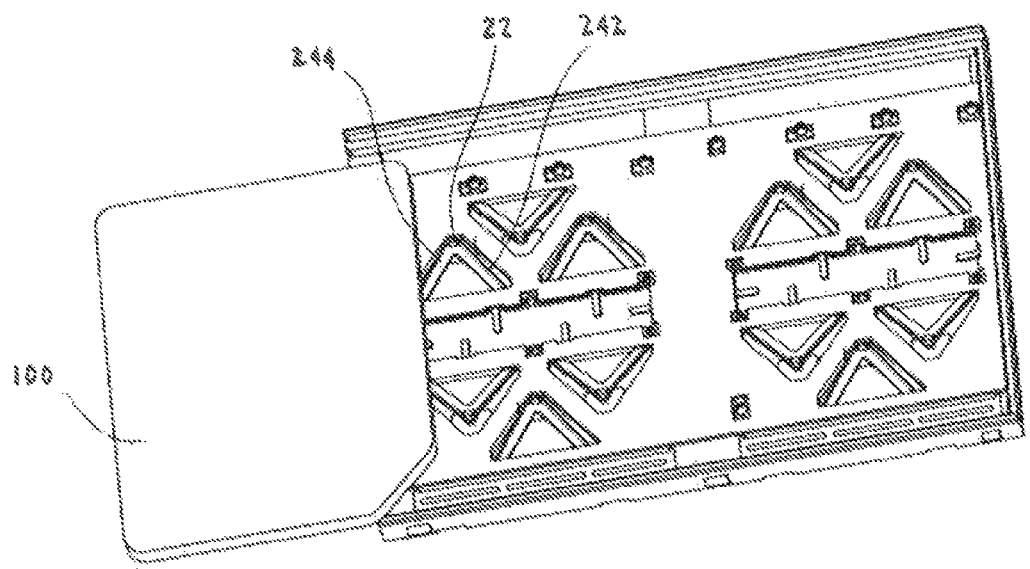
FIG. 7 is a perspective view of the complimentary SIM card being inserted in the card connector of FIG. 6.

When the SIM card 100 is inserted in the card insertion direction A, as shown in FIGS. 5 and 7, the card 100 firstly contacts and presses down the front elastic arm 244 of the supporting element. In this way, the supporting element is gradually pressed down, and the contact element 22 on the supporting element displaces downward, so that the card 100 can slide over the contact 20). The front elastic arm 244 guides the card 100 to slide over the contact 20 during inserting the card 100 in the card insertion direction A, so as to prevent the contact element 22 or the contact 20 from being scratched by the card 100.

Similarly, when the SIM card 100 is pulled out of the connector in a card-removing direction opposite to the card insertion direction A, the card 100 firstly contacts and presses down the rear elastic arm 242 of the supporting element. In this way, the supporting element is gradually pressed down, and the contact element 22 on the supporting element displaces downward, so that the card 100 can slide over the contact 20. The rear elastic arm 242 guides the card 100 to slide over the contact 20 during pulling out the card 100 in the card-removing direction, so as to prevent the contact element 22 or the contact 20 from being scratched by the card.

Since the elastic arm 242 and the elastic arm 244 are position at both sides of the plane P, respectively, the card 100 is always smoothly guided by one of the elastic arm 242 and the elastic arm 244 of the respective contact 20 whether in the card insertion direction A or in the card-removing direction.

An angle of each of the two elastic arms 242, 244, with respect to the plane P, is designed to be less than 90 degrees. In an embodiment, the angle of each of the two elastic arms 242, 244, with respect to the plane P, is approximately 20 to 60 degrees. In this way, the contact element of the contact 20 can effectively be prevented from being scratched. Further, the contact 20 is effectively prevented from being damaged by the card 100 or the card tray during plugging the card 100 or the card tray into or out of the connector, especially during removal of an empty card tray.

The above description also applies to situations where a card tray 200 is inserted into or pulled out of the connector. Similarly, the frame (220) of the card tray 200 is smoothly guided by one of the two elastic arms 242 and 244 of the respective contact 20, and the frame does not scratch the contact element 22 or other portion of the contact 20. As shown in and embodiment of FIGS. 8 and 9a, the card tray 200 is partly pulled out of the card connector, and a card adapter 210 is mounted on the card tray 200. One of ordinary skill in the art would appreciate that it is also possible to directly load the SIM card in the card tray 200, instead of in the card adapter 210.

Figure 8:
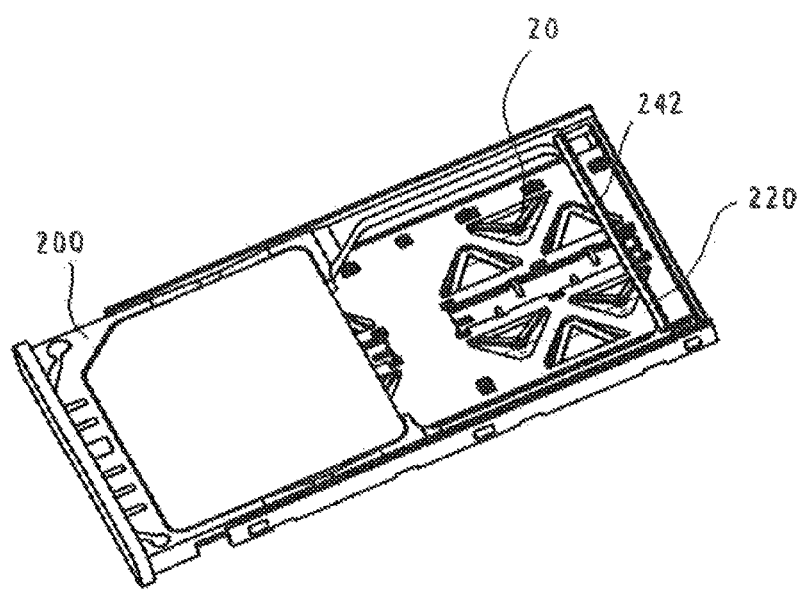
FIG. 8 is a perspective view of the card connector of FIG. 6, in which a card tray is partly displaced out of the card connector, and a card adapter is positioned on the card tray.
Figure 9A:
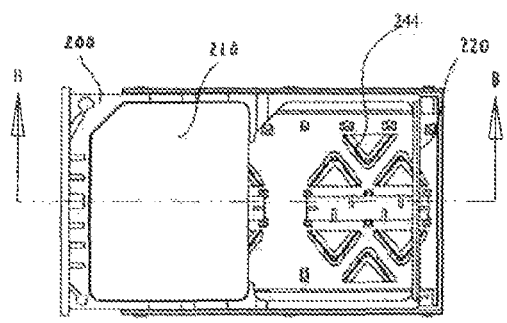
FIG. 9a is a perspective view of a top of the card connector of FIG. 8.
Figure 9B:
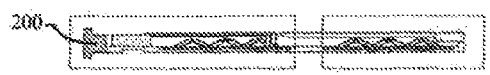
FIG. 9b is a cross-sectional view of the card connector of FIG. 8 taken in a line B-B of FIG. 9a, FIG. 9c is an enlarged cross-sectional view of two local portions of the card connector of FIG. 9b.
Figure 9C:
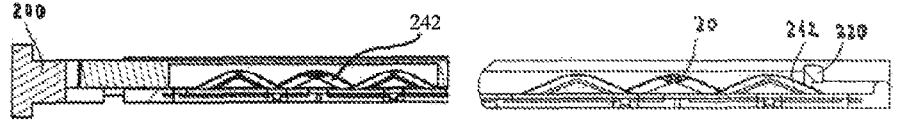
Figure 10:
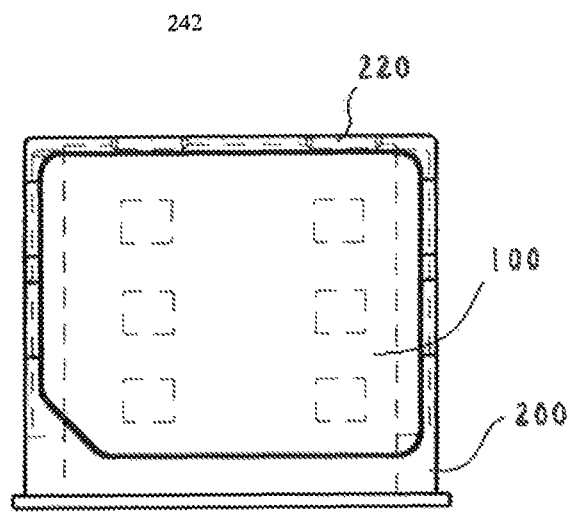
FIG. 10 is a perspective view of a card tray complimentary to the card connector of FIG. 5.
Figure 11:
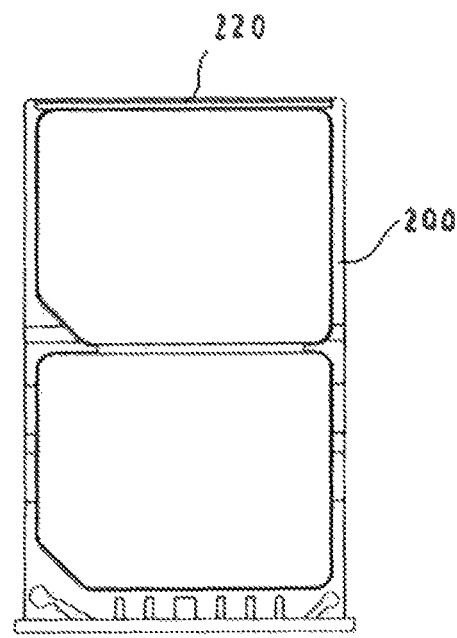
FIG. 11 is a perspective view of a card tray complimentary to the card connector of FIG. 6.

When the card tray 200 is being pulled out of the card connector, as shown in FIGS. 8, 9a and 9c, the frame 220 of the card tray 200 directly presses against the elastic arm 242 and drives the contact element 22 of the contact 20 downward. Thus, the contact element 22 is prevented from being scratched and the contact 20 is prevented from being damaged during further pulling the card tray 200 out of the card connector.

In an embodiment, positioning the two elastic arms 242 and 244 on both sides of the plane P, respectively, effectively prevents or minimizes a risk that the contact element 22 of the contact 20 is scratched by the card 100 or the card tray 200 during pulling the card 100 or the card tray 200 out of the card connector.

Figure 12:
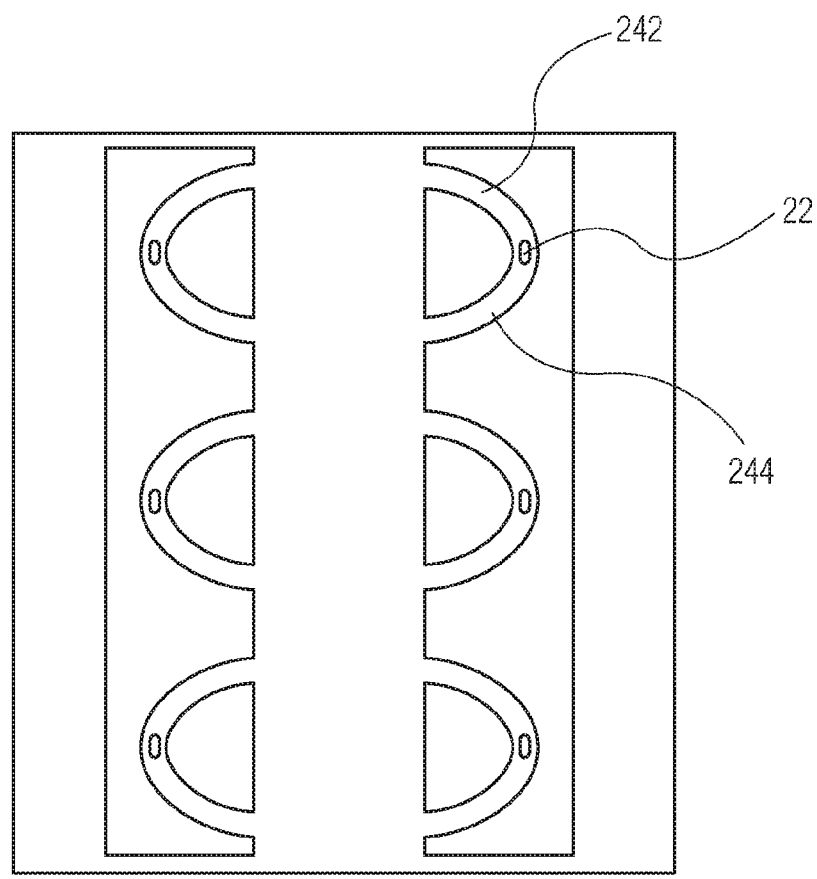
FIG. 12 is a perspective view of a top of an alternate card connector having a U-Shaped support member.

Although not shown, one of ordinary skill in the art would appreciate that a planar contact member may be connected between the two elastic arms 242, 244 to form a triangular support member. The planar contact member includes a soldering portion for soldering the contact 20 to a circuit board. The triangular support member has sufficient flexibility so it may flex with the two elastic arms 242, 244. In an embodiment, shown in FIG. 12, the two elastic arms 242,244 together constitute a U-shaped support member and the contact element 22 functions as a vertex of the U-shaped support member.

As shown in the embodiments of FIGS. 2-6, the two elastic arms 242, 244 together form a V-shaped support member 24, and the contact element 22 is positioned at a vertex of the V-shaped support member 24.

In an embodiment, the front elastic arm 244 of one contact 20 may be parallel to the front elastic arm 244 or the rear elastic arm 242 of another contact 20, and the rear elastic arm 242 of one contact 20 may be parallel to the rear elastic arm 242 or the front elastic arm 244 of another contact 20.

In an embodiment, an angle of one of the two elastic arms 242, 244 of each contact 20 with respect to the plane P is equal to an angle of the other of the two elastic arms 242, 244 of each contact 20 with respect to the plane P. As shown in the embodiments FIGS. 2-6, the angle of each of the two elastic arms 242, 244 with respect to the plane P may be equal to 45 degrees, and the two elastic arms 242, 244 may have the same length. One of ordinary skill in the art would appreciate that in other embodiments, the angles of the two elastic arms 242,244 with respect to the plane P may be different from each other, and correspondingly, the two elastic arms 242,244 may have the different lengths.

In an embodiment of FIG. 3, all of the contact elements 22 of the plurality of contacts 20 are arranged in two rows and evenly spaced in two straight lines. The rows are parallel and extend along the card insertion direction A, and all support members 24 of the plurality of contacts 20 are also arranged in two rows in two straight lines parallel to the card insertion direction A. Such configuration effectively prevents or minimizes the risk that the contact elements 22 may be scratched by the card 100 or the card tray 200 during pulling the card 100 or the card tray 200 out of the card connector. In other embodiments, the contact elements 22 of the plurality of contacts 20 are arranged in three, four or more rows.

As shown in an embodiment FIG. 2, all contact elements 22 of the plurality of contacts 20 are arranged in two rows and evenly spaced in two straight lines parallel to the card insertion direction A, and all support members 24 of the plurality of contacts 20 are arranged in four rows. At each side of each row of contact elements 22 is arranged with one row of support members 24.

As shown in FIG. 2, two rows of support members 24 are arranged at both sides of each row of contact elements 22, the support members 24 of one row of support members 24 and the support members 24 of the other row of support members 24 are alternately positioned along the card insertion direction A. In this way, the supporting element 24 of one row of support members 24 is positioned in a gap between the support members 24 of the other row of support members 24, to reduce a distance between two adjacent contact elements 22 in the card insertion direction A. A distance d2 between two adjacent contact elements 22 in each row is less than a total length of two adjacent elastic arms 242,244 of two adjacent support members 24 of a row one side of the row of contact elements 22 projected on the line. In an embodiment, the distance d2 between two adjacent contact elements 22 of each row is equal to 2.54 mm.

In an embodiment, the distance d2 is equal to a distance between two adjacent pads 110 on the SIM card 100 in the card insertion direction A.

In an embodiment, when the support members 24 are alternately positioned at both sides of each row of contact elements 22, and the distance between two adjacent contact elements 22 of each row is less than the total length of two adjacent elastic arms of two adjacent support members 24 of a row of support members 24 at one side of the row of contact elements 22 projected on the line, a total length of the card connector in the card insertion direction A may be minimized.

In another embodiment (not shown), the support members 24 may be positioned at both sides of each row of contact elements 22 and are not alternately arranged, but rather, adjacent support members 24 in both rows are positioned in an approximate linearly spaced grid.

In an embodiment of FIG. 4, a variation of the contact arrangement of FIG. 2 is shown where all contacts 20 for electrically connecting the card 100 may be formed by a single punching of a metal sheet. The base 10 is molded on the contacts 20 by over molding, to give a structurally distinct, overmolded structure, whereby the contacts 20 are partially embedded in the base 10. Lastly, electrical connections between the contacts 20 are severed.

Those of ordinary skill in the art would appreciate that the above embodiments are intended to be exemplary, and not restrictive. For example, many modifications may be made to the above embodiments by those of ordinary skill in the art, and various features described in different embodiments may be freely combined with each other without conflicting in configuration or principle.

Although several exemplary embodiments have been shown and described, it would also be appreciated by those of ordinary skill in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding a plurality of said elements or steps, unless such exclusion is explicitly stated. Furthermore, references to "one embodiment," "an embodiment," or "the embodiment" are not intended to be interpreted as excluding the existence of additional embodiments that also incorporate the recited features. Moreover, unless explicitly stated to the contrary, embodiments "comprising," "having," or "including" an element or a plurality of elements having a particular property may include additional such elements not having that property.

What is claimed is:

1. A card connector for receiving an electrical card, comprising:
   a base; and
   a plurality of contacts positioned on the base, each contact having
      a support member with two elastic arms extending away from the base, with each elastic arm having an edge that intersects together at a vertex that is elastically flexible toward and away from the base, and
      a contact element positioned at the vertex, the two elastic arms positioned at both sides of a plane passing through the contact element and perpendicular to a card insertion direction.

2. The card connector of claim 1, wherein the two elastic arms together define a V-shaped support member, with the contact element being positioned at the vertex of the V-shaped support member.

3. The card connector of claim 1, wherein a planar contact member is connected between the two elastic arms of the support member to form a triangular support member.

4. The card connector of claim 3, wherein the planar contact member has a solder portion.

5. The card connector of claim 1, wherein the two elastic arms together define a U-shaped support member, with the contact element being positioned at the vertex of the U-shaped support member.

6. The card connector of claim 1, wherein an angle of each of the two elastic arms with respect to the plane is between 20-60 degrees.

7. The card connector of claim 6, wherein one of the two elastic arms is positioned at a front side of the plane in the card insertion direction, and the other elastic arm is positioned at a rear side of the plane in the card insertion direction.

8. The card connector of claim 7, wherein the angle of the front elastic arm of each contact is approximately equal to the angle of the rear elastic arm of each contact.

9. The card connector of claim 8, wherein the two elastic arms are approximately equal in length.

10. The card connector of claim 8, wherein the angle of each of the two elastic arms is approximately 45 degrees with respect to the plane.

11. The card connector of claim 10, wherein the contact elements are positioned in two rows extending as two straight lines parallel to the card insertion direction.

12. The card connector of claim 11, wherein the support members are alternately positioned at both sides of each row of contact elements.

13. The card connector of claim 12, wherein a distance between two adjacent contact elements of each row is less than a total length of two adjacent elastic arms of two adjacent support members of a row on one side of the row of contact elements projected on the line.

14. The card connector of claim 12, wherein the front elastic arm and rear elastic arm of each contact has the same length and the same angle with respect to the plane.

15. The card connector of claim 14, wherein each row of contact elements has three or four contact elements.

16. The card connector of claim 15, wherein the distance between two adjacent contact elements of each row is approximately 2.54 mm.

17. The card connector of claim 12, wherein the base defines a card receiving space.

18. The card connector of claim 17, wherein the contact elements protrude outward into the card receiving space.

19. The card connector of claim 1, wherein the plurality of contacts includes a first and a second group of contacts, the first group of contacts electrically connecting to an inserted first electrical card, and the second group of contacts electrically connecting to an inserted second electrical card.

* * * * *